US011839232B2

(12) United States Patent
Li et al.

(10) Patent No.: US 11,839,232 B2
(45) Date of Patent: Dec. 12, 2023

(54) METHOD FOR PREPARING TAR EXTRACT HAVING AROMATIC CHARACTERISTICS BY USING DISCARDED CIGARETTE BUTT, AND USE THEREOF IN CIGARETTE

(71) Applicant: INNER MONGOLIA KUNMING CIGARETTE CO., LTD., Hohhot (CN)

(72) Inventors: Liqun Li, Hohhot (CN); Yajun Ye, Hohhot (CN); Ying Chai, Hohhot (CN); Junsong Zhang, Hohhot (CN); Chen Chen, Hohhot (CN); Chunsheng Guo, Hohhot (CN); Xudong Ji, Hohhot (CN); Shu Tian, Hohhot (CN); Xudong Wang, Hohhot (CN); Yuemei Qiao, Hohhot (CN); Ruili Li, Hohhot (CN); Miao Liang, Hohhot (CN); Wenjie Zhang, Hohhot (CN)

(73) Assignee: INNER MONGOLIA KUNMING CIGARETTE CO., LTD., Hohhot (CN)

( * ) Notice: Subject to any disclaimer, the term of this patent is extended or adjusted under 35 U.S.C. 154(b) by 0 days.

(21) Appl. No.: 17/780,543

(22) PCT Filed: Nov. 16, 2020

(86) PCT No.: PCT/CN2020/129090
§ 371 (c)(1),
(2) Date: May 27, 2022

(87) PCT Pub. No.: WO2021/104082
PCT Pub. Date: Jun. 3, 2021

(65) Prior Publication Data
US 2023/0132114 A1 Apr. 27, 2023

(30) Foreign Application Priority Data
Nov. 27, 2019 (CN) .......................... 201911179288.2

(51) Int. Cl.
| A24B 15/26 | (2006.01) |
| B01D 11/02 | (2006.01) |
| B01D 3/12 | (2006.01) |
| B01D 3/10 | (2006.01) |
| A24D 3/04 | (2006.01) |

(52) U.S. Cl.
CPC .............. *A24B 15/26* (2013.01); *A24D 3/048* (2013.01); *B01D 3/10* (2013.01); *B01D 3/12* (2013.01); *B01D 11/0288* (2013.01)

(58) Field of Classification Search
None
See application file for complete search history.

(56) References Cited

U.S. PATENT DOCUMENTS

| 2,770,239 A | * | 11/1956 | Prats ...................... A24B 15/24 |
| | | | 131/309 |
| 2006/0283469 A1* | | 12/2006 | Lipowicz ............. A24B 15/308 |
| | | | 131/352 |
| 2015/0201669 A1 | | 7/2015 | Junker et al. |

FOREIGN PATENT DOCUMENTS

| CN | 102559388 A | 7/2012 |
| CN | 105105317 A | 12/2015 |
| CN | 105146739 A | 12/2015 |
| CN | 105779128 A | 7/2016 |
| CN | 105861154 A | 8/2016 |
| CN | 106263013 A | 1/2017 |
| CN | 109111992 A | 1/2019 |
| CN | 109959649 A | 7/2019 |
| CN | 111035051 A | 4/2020 |
| WO | 2017181684 A1 | 10/2017 |

OTHER PUBLICATIONS

YC/T 415-2011, Tobacco in processing—Sensory evaluation methods, 2011, pp. 1-8, State Tobacco Monopoly Administration.
Dengfeng Huang, Studies on Recycling and Use of the Cigarette Butts, Chinese Master's Theses Full-Text Database, Engineering Science and Technology I, 2013, pp. 1-19.
Chinese Academy of Agricultural Sciences Tobacco Research, Chinese Tobacco Cultivation, Main chemical constituents of tobacco, 2005, pp. 78.
Huang Dengfeng, Studies on recycling and use of the Cigarette butts, A Thesis for the Degree of Master Qiqihar University, 2012, pp. 1-43.

* cited by examiner

*Primary Examiner* — Dennis R Cordray
(74) *Attorney, Agent, or Firm* — Bayramoglu Law Offices LLC

(57) ABSTRACT

A method for preparing a tar extract with aroma characteristics from a discarded cigarette butt includes: (1) adding the discarded cigarette butt to an extraction solvent, and carrying out subcritical fluid extraction to obtain an extraction solution; (2) carrying out vacuum filtration on the extraction solution, and carrying out vacuum distillation on the filtrate to obtain a concentrated extractum; and (3) carrying out molecular distillation on the concentrated extractum, and collecting a light fraction of the molecular distillation to obtain the tar extract with aroma characteristics. Through the subcritical fluid extraction and separation by the molecular distillation to prepare the tar extract, harmful substances in the tar are removed, and the aroma components are retained. The tar extract is applied to a cigarette to improve the aroma, smoke and taste characteristics of the cigarette.

12 Claims, No Drawings

METHOD FOR PREPARING TAR EXTRACT HAVING AROMATIC CHARACTERISTICS BY USING DISCARDED CIGARETTE BUTT, AND USE THEREOF IN CIGARETTE

CROSS REFERENCE TO THE RELATED APPLICATIONS

This application is the national phase entry of International Application No. PCT/CN2020/129090, filed on Nov. 16, 2020, which is based upon and claims priority to Chinese Patent Application No. 201911179288.2, filed on Nov. 27, 2019, the entire contents of which are incorporated herein by reference.

TECHNICAL FIELD

The present disclosure relates to a method for preparing a tar extract with aroma characteristics from a discarded cigarette butt and use of the tar extract in a cigarette, belonging to the technical field of tobacco technology.

BACKGROUND

A cigarette butt is a byproduct after cigarette consumption, mainly composed of a filter, a residual tobacco blend, cigarette paper and tipping paper. China is a big country in cigarette production and consumption. With a large number of cigarettes consumed every year, lots of discarded cigarette butts are produced and discarded casually, causing pollution to the environment. Tar trapped in the discarded cigarette butts contains not only aroma components that have a positive effect on sensory quality, such as ketones, furans and pyrazines, but also nicotine that can improve consumers' physiological satisfaction, and harmful substances that have an obvious negative effect on sensory quality, such as amines and aldehydes. Therefore, it is of great significance to extract tar in the discarded cigarette butts and prepare an extract with certain properties or effects.

Subcritical fluid extraction is a new extraction and separation technique developed after supercritical fluid extraction. By using a subcritical fluid as an extraction solvent, the extraction is carried out under closed, oxygen-free, low-pressure and low-temperature conditions. Subcritical fluid extraction has the advantages of easy recovery of solvents without residue, low proneness to oxidation of an extraction product, a wide selection range of solvents, low extraction pressure and correspondingly low requirements for reaction equipment, and thus has received increasing attention and has wide popularization and application prospects.

CN109959649A discloses a cigarette tar extract with chemiluminescent properties. A method of preparing the cigarette tar extract includes the step of: adding cigarette tar to a reagent for extraction to obtain the cigarette tar extract. The cigarette tar may be obtained by the following steps: smoking a cigarette, filtering the generated smoke, and collecting smoke particulate matters to obtain the cigarette tar. The cigarette tar extract in this patent is obtained by ultrasound-assisted extraction in an open system under natural light conditions, so a luminescent substance contained has stable properties and are insensitive to light, oxygen and temperature, etc. This extract has a wide luminescence response range for pH of a medium, and is capable of being subjected to a chemiluminescent reaction under acidic, neutral or alkaline conditions. In this patent, the cigarette tar is the tar in the smoke particulate matters, and the prepared tar extract is luminescent, so this patent does not involve extraction of tar in the cigarette butt to obtain the tar aroma components CN102559388A discloses a tobacco essential oil and a method for preparing the same, and use of the tobacco essential oil in cigarettes. The tobacco essential oil is prepared by the following method including: taking discarded/defective tobacco wastes, carrying out extraction with an organic solvent, obtaining a crude extract of essential oil, introducing water vapor, carrying out condensation, and separating oil and water to obtain the tobacco essential oil. In this patent, the tobacco essential oil is added to a cigarette tobacco blend as an aroma enhancer, and can enhance the original aroma of tobacco, improve the aroma quality and quantity of cigarettes, reduce the irritancy and offensive odor of the tobacco and soften the smoke. The discarded/defective tobacco wastes produced in the cigarette production process, which are used as a raw material, are free of tar, so this patent does not involve an extraction process for the cigarette butt.

SUMMARY

The present disclosure aims to provide a method for preparing a tar extract with aroma characteristics from a discarded cigarette butt. By using the discarded cigarette butt as a raw material, subcritical fluid extraction and separation by molecular distillation are used to obtain the tar extract with aroma characteristics, and the obtained tar extract is applied to a cigarette to enhance the aroma of the cigarette.

In the present disclosure, the discarded cigarette butt used as the raw material is discarded by people in an ashtray, on the roadside, etc., so the method has the advantages of wide raw material sources and low cost. A yellow discarded cigarette butt is selected due to its higher tar content.

In one aspect, the present disclosure provides a method for preparing a tar extract with aroma characteristics from a discarded cigarette butt, including the following steps:
(1) adding the discarded cigarette butt to an extraction solvent, and carrying out subcritical fluid extraction to obtain an extraction solution;
(2) carrying out vacuum filtration on the extraction solution, and carrying out vacuum distillation on the filtrate to obtain a concentrated extractum; and
(3) carrying out molecular distillation on the concentrated extractum, and collecting a light fraction of the molecular distillation to obtain the tar extract with aroma characteristics.

Preferably, in the step (1), the extraction solvent is at least one of n-butane, ethanol, petroleum ether, n-hexane, acetone, dichloromethane and ethyl acetate.

Preferably, a ratio of the discarded cigarette butt to the extraction solvent is 1 g:5-80 mL.

Preferably, in the step (1), the subcritical fluid extraction is carried out under an extraction pressure of 0.6-1.6 MPa at an extraction temperature of 20-60° C. for 10-120 min for 1-3 times. More preferably, the extraction pressure is 0.7-1.2 MPa, a lower limit of the extraction pressure is selected from 0.8 MPa, 0.9 MPa, 1.0 MPa or 1.1 MPa, and an upper limit of the extraction pressure is selected from 0.8 MPa, 0.9 MPa, 1.0 MPa or 1.1 MPa. More preferably, the extraction temperature is 30-50° C., a lower limit of the extraction temperature is selected from 35° C., 40° C. or 45° C., and an upper limit of the extraction temperature is selected from 35° C., 40° C. or 45° C. More preferably, the extraction time is 50-100 min, a lower limit of the extraction time is selected from 60 min, 70 min, 80 min or 90 min, and an upper limit of the extraction time is selected from 60 min, 70 min, 80 min or 90 min.

Preferably, in the step (2), the vacuum distillation is carried out at a temperature of 25-45° C. under a pressure of 0.06-0.08 Mpa.

Preferably, in the step (3), the molecular distillation is two-stage molecular distillation, and light fractions of first-stage molecular distillation and second-stage molecular distillation are mixed.

Preferably, the first-stage molecular distillation is carried out at a heating temperature of 50-80° C. under a pressure of 100-200 Pa at a feed rate of 300-600 mL/h and a film wiping speed of 200-300 rpm. More preferably, the first-stage molecular distillation is carried out at a heating temperature of 60-70° C. More preferably, the pressure is 110 Pa-190 Pa. A lower limit of the pressure is selected from 120 Pa, 130 Pa, 140 Pa, 150 Pa, 160 Pa, 170 Pa or 180 Pa, and an upper limit of the pressure is selected from 120 Pa, 130 Pa, 140 Pa, 150 Pa, 160 Pa, 170 Pa or 180 Pa.

Preferably, the second-stage molecular distillation is carried out at a heating temperature of 90-110° C. under a pressure of 40-60 Pa at a feed rate of 300-600 mL/h and a film wiping speed of 200-300 rpm. More preferably, the second-stage molecular distillation is carried out at a heating temperature of 95-105° C. under a pressure of 45-55 Pa. Most preferably, the second-stage molecular distillation is carried out at a heating temperature of 100° C. under a pressure of 50 Pa.

Preferably, the method further includes a step of pretreating the discarded cigarette butt.

Preferably, the pretreating specifically includes: tearing off tipping paper from the discarded cigarette butt, removing cigarette paper and a residual tobacco blend, collecting a fiber tow, and cutting the fiber tow into small segments with a length of less than 1 cm.

In a second aspect, the present disclosure further provides a tar extract prepared by the method.

In a third aspect, the present disclosure further provides use of the tar extract in the preparation of a flavor. The tar extract is applied to the flavor as an aroma component.

In a fourth aspect, the present disclosure further provides use of the tar extract in the preparation of a cigarette.

Preferably, the tar extract is added to an auxiliary material or a reconstituted tobacco blend of the cigarette in an amount of 2-5% of the weight of the cigarette.

Preferably, the cigarette is a middle- and low-end traditional cigarette.

The present disclosure has the following beneficial effects:

(1) Through the subcritical fluid extraction and separation by the molecular distillation to prepare the tar extract, harmful substances in the tar are removed, and the aroma components are retained. The tar extract is applied to the cigarette to improve the aroma, smoke and taste characteristics of the cigarette, thereby providing an efficient path for widening the application scope of inferior tobacco leaves and increasing the usage amount of the inferior tobacco leaves in middle- and low-end cigarettes.

(2) By optimizing the conditions of the subcritical fluid extraction and separation by the molecular distillation, the tar extract is prepared from the cigarette butt at a higher extraction yield. The discarded cigarette butt is used as the raw material, which can not only prevent the cigarette butt from polluting the environment, but also make use of the byproduct tar after smoking the cigarette.

DETAILED DESCRIPTION OF THE EMBODIMENTS

The present disclosure will be described in detail in conjunction with specific examples.

The following examples are only explanations for those skilled in the art to understand the technical solution of the present disclosure and to realize or use the present disclosure, and are not intended to limit the protection range of the present disclosure.

Unless otherwise specified, the raw materials and equipment used in the present disclosure are those available from the market or commonly used in the art.

The methods in the examples, unless otherwise specified, are conventional methods in the art.

Example 1 Extraction of Tar Extract with Aroma Characteristics from Discarded Cigarette Butt A method for preparing a tar extract with aroma characteristics from a discarded cigarette butt included the following steps:

(1) pretreating of the discarded cigarette butt: tipping paper was torn off from the discarded cigarette butt, cigarette paper and a residual tobacco blend were removed, a fiber tow was collected, and the fiber tow was cut into small segments with a length of less than 1 cm;

(2) 20 g of the pretreated discarded cigarette butt was added to a subcritical fluid extraction tank, 800 mL of n-butane was injected, and subcritical fluid extraction was carried out once under an extraction pressure of 1.0 MPa at an extraction temperature of 40° C. for 70 min, thereby obtaining an extraction solution;

(3) vacuum filtration was carried out the extraction solution, and vacuum distillation was carried out on the filtrate at 30° C. under 0.07 Mpa to obtain a concentrated extractum; and (4) two-stage molecular distillation was carried out on the concentrated extractum, wherein first-stage molecular distillation was carried out at a heating temperature of 60° C. under a pressure of 150 Pa at a feed rate of 400 mL/h and a film wiping speed of 250 rpm; and second-stage molecular distillation was carried out at a heating temperature of 100° C. under a pressure of 50 Pa at a feed rate of 400 mL/h and a film wiping speed of 250 rpm; and light fractions of the first-stage molecular distillation and the second stage molecular distillation were mixed to obtain the tar extract.

The obtained tar extract was detected by GC/MS. The obtained components were furfural, furfuryl alcohol, ethylene glycol diacetate, 1-(1,3-dioxolan-2-yl)acetone, 4-cyclopentene-1,3-dione, methylcyclopentenolone, nicotine, 2(5H)-furanone, 5-methylfurfural, 3-methyl-2-cyclopenten-1-one, methylcyclopentenolone, benzyl alcohol, 2,3-dimethyl-2-cyclopentenone, ethylcyclopentenolone, 5-hydroxymethylfurfural, vanillin, megastigmatrienone A, 2,4,4-trimethylpentane-1,3-diyl bis(2-methylpropionate), farnesol, phthalic acid 1-butyl 2-isobutyl ester, scopoletin and tributyl prop-1-ene-1,2,3-tricarboxylate.

GC/MS Conditions:
HP 6890/5973 GC-MS
(1) GC Conditions:
Chromatographic column: ULTRA2 (50 m×0.2 mm i.d× 0.33 μm d.f)
Detector: MS
Carrier gas, flow rate: He, 0.6 ml/min
Temperature of injection port: 290° C.
Temperature program: 80° C. (1 min) 2° C./min→280° C. (10 min)
Split ratio, injection volume: 1:10, 2 μl
(2) GC/MS Conditions:
GC conditions: the same as above
Temperature of transfer line: 230° C.
Temperature of ion source: 230° C.
Ionization energy: 70 eV
Mass range: 30-350 u
Carrier gas: He
MS spectra: NIST Library Example 2 Use of Tar Extract in Cigarette The cigarette tar extract prepared in Example 1 was added to a cigarette filter in an amount of 2% of the weight of the cigarette to prepare a cigarette sample A with tar aroma components.

The cigarette tar extract prepared in Example 1 was added to a cigarette tobacco blend in an amount of 2% of the weight of the cigarette to prepare a cigarette sample B with tar aroma components.

The cigarette tar extract prepared in Example 1 was added to a cigarette tobacco blend in an amount of 3% of the weight of the cigarette to prepare a cigarette sample C with tar aroma components.

After the cigarette samples prepared by the above solution and a cigarette without the tar aroma components were equilibrated in a constant-temperature and constant-humidity environment of (20±1°) C and (60±3)% RH for 24 h, 10 or more smoking evaluators were organized to perform sensory evaluation on the cigarette samples with reference to Tobacco in processing-Sensory evaluation methods (YC/T 415-2011). The evaluation results are shown in Table 1.

TABLE 1

Characteristic sensory evaluation results of cigarettes with tar characteristic aroma components

| Evaluation sample | | Control sample | Sample 1 | Sample 2 | Sample 3 |
|---|---|---|---|---|---|
| Aroma characteristics | Quality of aroma | 6.0 | 6.5 | 6.5 | 7.0 |
| | Quantity of aroma | 6.0 | 6.5 | 6.5 | 7.0 |
| | Offensive odor | 6.0 | 6.5 | 6.5 | 6.5 |
| | Volatility | 5.5 | 6.0 | 5.8 | 6.2 |
| Smoke characteristics | Concentration | 6.0 | 6.5 | 6.5 | 6.8 |
| | Strength | 5.5 | 6.0 | 6.5 | 6.8 |
| | Harshness | 5.5 | 6.0 | 6.0 | 6.0 |
| | Agglomeration | 5.5 | 5.5 | 5.8 | 6.0 |
| Taste characteristics | Irritancy | 5.5 | 6.0 | 5.8 | 6.5 |
| | Dry feeling | 5.5 | 6.0 | 6.0 | 6.0 |
| | Clean degree | 5.5 | 5.5 | 5.8 | 5.8 |
| | Sweet aftertaste | 4.0 | 4.8 | 5.3 | 5.5 |

As shown in Table 1, compared with the control group, after the tar extract prepared in the example of the present disclosure was added, the smoke characteristics, the aroma characteristics and the taste characteristics of cigarettes were improved to different degrees. The quality of aroma and the quantity of aroma of the cigarettes were improved significantly, and the offensive odor was reduced. The concentration and strength of the smoke were increased, and the harshness and agglomeration were also improved. The irritancy was reduced, the dry feeling was decreased, and the sweet aftertaste was increased. After the tar extract prepared in the example of the present disclosure was added, the sensory quality of the cigarettes could be improved effectively, thereby providing an efficient path for widening the usage scope of inferior tobacco leaves and increasing the usage amount of the inferior tobacco leaves in middle- and low-end cigarettes.

Example 3 Selection of Conditions for Preparation Method

1. Selection of Extraction Pressure 20 g of the treated discarded cigarette butt was added to a subcritical fluid extraction tank. Then, 800 mL of n-butane was injected into the extraction tank, and subcritical fluid extraction was carried out on the discarded cigarette butt once at an extraction temperature of being set to be 40° C. under extraction pressures of 0.6 MPa, 0.8 MPa, 1.0 MPa and 1.2 MPa, respectively for 70 min. The effects of different extraction pressures on extraction effects were compared and analyzed. The detection results are shown in Table 2. As can be seen from Table 2, the extraction under 1.0 MPa had the best extraction effects.

TABLE 2

Extraction effects of different extraction pressures (mg/g)

| No. | Holding time/min | Component | Extraction pressure (MPa) | | | |
|---|---|---|---|---|---|---|
| | | | 0.6 | 0.8 | 1.0 | 1.2 |
| 1 | 11.087 | Furfural | 0.75 | 1.00 | 1.06 | 1.02 |
| 2 | 11.963 | Furfuryl alcohol | 0.77 | 0.96 | 1.09 | 1.10 |
| 3 | 12.428 | Ethylene glycol diacetate | 0.39 | 0.48 | 0.51 | 0.50 |
| 4 | 13.016 | 1-(1,3-dioxolan-2-yl)acetone | 0.37 | 0.46 | 0.50 | 0.52 |
| 5 | 13.258 | 4-cyclopentene-1,3-dione | 0.35 | 0.46 | 0.49 | 0.50 |
| 6 | 14.24 | Methylcyclopentenolone | 0.33 | 0.44 | 0.45 | 0.42 |
| 7 | 14.406 | Nicotine | 1.62 | 2.10 | 2.29 | 2.24 |
| 8 | 14.446 | 2-acetylfuran | 0.23 | 0.28 | 0.31 | 0.30 |
| 9 | 14.646 | 2(5H)-furanone | 0.33 | 0.42 | 0.45 | 0.42 |
| 10 | 15.895 | Phenol | 0.33 | 0.41 | 0.42 | 0.41 |
| 11 | 16.934 | 5-methylfurfural | 1.19 | 1.49 | 1.62 | 1.61 |
| 12 | 17.051 | 3-methyl-2-cyclopenten-1-one | 0.71 | 0.89 | 0.95 | 0.97 |
| 13 | 19.863 | 3,4-dimethyl-2-cyclopentanone | 0.16 | 0.19 | 0.21 | 0.21 |
| 14 | 20.257 | Methylcyclopentenolone | 1.35 | 1.62 | 1.80 | 1.75 |
| 15 | 20.545 | Benzyl alcohol | 0.36 | 0.44 | 0.51 | 0.48 |
| 16 | 20.745 | 2,3-dimethyl-2-cyclopentenone | 0.80 | 0.92 | 1.06 | 1.07 |
| 17 | 20.927 | 2,6-dimethylphenol | 0.27 | 0.33 | 0.37 | 0.36 |
| 18 | 24.792 | Ethylcyclopentenolone | 0.39 | 0.48 | 0.52 | 0.51 |
| 19 | 25.803 | 2,4,6-trimethylphenol | 0.24 | 0.28 | 0.31 | 0.29 |
| 20 | 28.668 | Ethyl maltol | 0.17 | 0.17 | 0.18 | 0.17 |
| 21 | 29.294 | 4-ethylguaiacol | 0.22 | 0.26 | 0.29 | 0.28 |
| 22 | 29.768 | Cinnamaldehyde | 0.17 | 0.20 | 0.21 | 0.20 |
| 23 | 30.262 | 5-hydroxymethylfurfural | 0.94 | 1.24 | 1.32 | 1.25 |
| 24 | 31.06 | 2,6-dimethoxyphenol | 0.26 | 0.29 | 0.35 | 0.33 |
| 25 | 31.362 | Anisic aldehyde | 0.24 | 0.29 | 0.32 | 0.30 |
| 26 | 33.262 | 2-methylnaphthalene | 0.34 | 0.40 | 0.44 | 0.42 |
| 27 | 37.938 | Vanillin | 0.45 | 0.58 | 0.62 | 0.59 |
| 28 | 45.367 | Megastigmatrienone A | 0.76 | 0.97 | 1.05 | 1.00 |
| 29 | 56.972 | Farnesol | 0.34 | 0.42 | 0.46 | 0.43 |
| 30 | 58.684 | Phthalic acid 1-butyl 2-isobutyl ester | 0.55 | 0.77 | 0.78 | 0.76 |
| 31 | 59.096 | Scopoletin | 0.50 | 0.49 | 0.58 | 0.55 |
| 32 | 64.684 | Tributyl prop-1-ene-1,2,3-tricarboxylate | 0.46 | 0.48 | 0.57 | 0.57 |

TABLE 2-continued

Extraction effects of different extraction pressures (mg/g)

| No. | Holding time/min | Component | \multicolumn{4}{c}{Extraction pressure (MPa)} | | | |
|---|---|---|---|---|---|---|
| | | | 0.6 | 0.8 | 1.0 | 1.2 |
| 33 | 70.424 | Oleamide | 0.43 | 0.53 | 0.54 | 0.52 |
| 34 | 94.252 | Natural vitamin E | 1.89 | 2.20 | 2.46 | 2.37 |
| | | Total | 18.67 | 22.95 | 25.09 | 24.42 |

2. Selection of Subcritical Fluid Extraction Temperature 20 g of the treated discarded cigarette butt was added to a subcritical fluid extraction tank. Then, 800 mL of n-butane was injected into the extraction tank, and subcritical fluid extraction was carried out on the discarded cigarette butt once under an extraction pressure of being set to be 1.0 MPa at extraction temperatures of 30° C., 35° C., 40° C. and 45° C., respectively for 70 m 4. The effects of different extraction temperatures on extraction effects were compared and analyzed. The detection results are shown in Table 3. As can be seen from Table 3, the extraction at 40° C. had the best extraction effects.

TABLE 3

Extraction effects of different subcritical fluid extraction temperatures (mg/g)

| No. | Holding time/min | Component | \multicolumn{4}{c}{Extraction temperature (° C.)} | | | |
|---|---|---|---|---|---|---|
| | | | 30 | 35 | 40 | 45 |
| 1 | 11.087 | Furfural | 0.89 | 1.01 | 1.06 | 1.07 |
| 2 | 11.963 | Furfuryl alcohol | 0.96 | 1.03 | 1.09 | 1.07 |
| 3 | 12.428 | Ethylene glycol diacetate | 0.44 | 0.49 | 0.51 | 0.49 |
| 4 | 13.016 | 1-(1,3-dioxolan-2-yl)acetone | 0.42 | 0.46 | 0.50 | 0.49 |
| 5 | 13.258 | 4-cyclopentene-1,3-dione | 0.44 | 0.49 | 0.49 | 0.48 |
| 6 | 14.24 | Methylcyclopentenolone | 0.34 | 0.41 | 0.45 | 0.45 |
| 7 | 14.406 | Nicotine | 2.08 | 2.15 | 2.29 | 2.28 |
| 8 | 14.446 | 2-acetylfuran | 0.23 | 0.25 | 0.31 | 0.32 |
| 9 | 14.646 | 2(5H)-furanone | 0.35 | 0.40 | 0.45 | 0.42 |
| 10 | 15.895 | Phenol | 0.35 | 0.35 | 0.42 | 0.43 |
| 11 | 16.934 | 5-methylfurfural | 1.30 | 1.48 | 1.62 | 1.61 |
| 12 | 17.051 | 3-methyl-2-cyclopenten-1-one | 0.84 | 0.86 | 0.95 | 0.89 |
| 13 | 19.863 | 3,4-dimethyl-2-cyclopentanone | 0.16 | 0.17 | 0.21 | 0.21 |
| 14 | 20.257 | Methylcyclopentenolone | 1.47 | 1.61 | 1.80 | 1.66 |
| 15 | 20.545 | Benzyl alcohol | 0.41 | 0.43 | 0.51 | 0.53 |
| 16 | 20.745 | 2,3-dimethyl-2-cyclopentenone | 0.87 | 1.00 | 1.06 | 1.01 |
| 17 | 20.927 | 2,6-dimethylphenol | 0.26 | 0.34 | 0.37 | 0.34 |
| 18 | 24.792 | Ethylcyclopentenolone | 0.41 | 0.49 | 0.52 | 0.53 |
| 19 | 25.803 | 2,4,6-trimethylphenol | 0.24 | 0.27 | 0.31 | 0.30 |
| 20 | 28.668 | Ethyl maltol | 0.12 | 0.15 | 0.18 | 0.20 |
| 21 | 29.294 | 4-ethylguaiacol | 0.25 | 0.26 | 0.29 | 0.29 |
| 22 | 29.768 | Cinnamaldehyde | 0.16 | 0.18 | 0.21 | 0.17 |
| 23 | 30.262 | 5-hydroxymethylfurfural | 0.99 | 1.18 | 1.32 | 1.17 |
| 24 | 31.06 | 2,6-dimethoxyphenol | 0.25 | 0.27 | 0.35 | 0.33 |
| 25 | 31.362 | Anisic aldehyde | 0.27 | 0.28 | 0.32 | 0.32 |
| 26 | 33.262 | 2-methylnaphthalene | 0.35 | 0.41 | 0.44 | 0.44 |
| 27 | 37.938 | Vanillin | 0.51 | 0.59 | 0.62 | 0.59 |
| 28 | 45.367 | Megastigmatrienone A | 0.83 | 0.93 | 1.05 | 0.98 |
| 29 | 56.972 | Farnesol | 0.34 | 0.40 | 0.46 | 0.44 |
| 30 | 58.684 | Phthalic acid 1-butyl 2-isobutyl ester | 0.67 | 0.71 | 0.78 | 0.76 |
| 31 | 59.096 | Scopoletin | 0.58 | 0.56 | 0.58 | 0.59 |
| 32 | 64.684 | Tributyl prop-1-ene-1,2,3-tricarboxylate | 0.50 | 0.52 | 0.57 | 0.54 |
| 33 | 70.424 | Oleamide | 0.44 | 0.50 | 0.54 | 0.51 |
| 34 | 94.252 | Natural vitamin E | 1.20 | 2.30 | 2.46 | 2.39 |
| | | Total | 19.90 | 22.95 | 25.09 | 24.32 |

Example 4

A method for preparing a tar extract with aroma characteristics from a discarded cigarette butt included the following steps:

(1) pretreating of the discarded cigarette butt: tipping paper was torn off from the discarded cigarette butt, cigarette paper and a residual tobacco blend were removed, a fiber tow was collected, and the fiber tow was cut into small segments with a length of less than 1 cm;

(2) 20 g of the pretreated discarded cigarette butt was added to a subcritical fluid extraction tank, 100 mL of petroleum ether was injected, and subcritical fluid extraction was carried out under an extraction pressure of 1.0 MPa at an extraction temperature of 40° C. for 10 min for 3 times, thereby obtaining an extraction solution;

(3) vacuum filtration was carried out the extraction solution, and vacuum distillation was carried out on the filtrate at 25° C. under 0.08 Mpa to obtain a concentrated extractum; and (4) two-stage molecular distillation was carried out on the concentrated extractum, wherein first-stage molecular distillation was carried out at a heating temperature of 50° C. under a pressure of 200 Pa at a feed rate of 600 mL/h and a film wiping speed of 300 rpm; and second-stage molecular distillation was carried out at a heating temperature of 90° C. under a pressure of 60 Pa at a feed rate of 600 mL/h and a film wiping speed of 300 rpm; and light fractions of the first-stage molecular distillation and the second-stage molecular distillation were mixed to obtain the tar extract.

Example 5

A method for preparing a tar extract with aroma characteristics from a discarded cigarette butt included the following steps:

(1) pretreating of the discarded cigarette butt: tipping paper was torn off from the discarded cigarette butt, cigarette paper and a residual tobacco blend were removed, a fiber tow was collected, and the fiber tow was cut into small segments with a length of less than 1 cm;

(2) 20 g of the pretreated discarded cigarette butt was added to a subcritical fluid extraction tank, 1.6 L of anhydrous ethanol was injected, and subcritical fluid extraction was carried out once under an extraction pressure of 1.0 MPa at an extraction temperature of 40° C. for 100 min, thereby obtaining an extraction solution;

(3) vacuum filtration was carried out the extraction solution, and vacuum distillation was carried out on the filtrate at 45° C. under 0.06 Mpa to obtain a concentrated extractum; and (4) two-stage molecular distillation was carried out on the concentrated extractum, wherein first-stage molecular distillation was carried out at a heating temperature of 80° C. under a pressure of 100 Pa at a feed rate of 300 mL/h and a film wiping speed of 200 rpm; and second-stage molecular distillation was carried out at a heating temperature of 110° C. under a pressure of 40 Pa at a feed rate of 300 mL/h and a film wiping speed of 200 rpm; and light fractions of the first-stage molecular distillation and the second-stage molecular distillation were mixed to obtain the tar extract.

Example 6

Example 6 was different from Example 5 in that: in the step (4), one-stage molecular distillation was carried out on the concentrated extractum, wherein the molecular distillation was carried out at a heating temperature of 80° C. under a pressure of 100 Pa at a feed rate of 300 mL/h and a film wiping speed of 200 rpm, thereby obtaining the tar extract. The rest were the same as the steps in the method in Example 5.

Example 7

Example 7 was different from Example 5 in that: in the step (4), one-stage molecular distillation was carried out on the concentrated extractum, wherein the molecular distillation was carried out at a heating temperature of 110° C. under a pressure of 40 Pa at a feed rate of 300 mL/h and a film wiping speed of 200 rpm, thereby obtaining the tar extract. The rest were the same as the steps in the method in Example 5.

The tar extracts prepared in Examples 4-7 were tested for their types and contents thereof. The test results showed that the types and contents of the tar extracts prepared in Examples 4-5 were greater than those of the tar extracts prepared in Examples 6-7.

The tar extracts prepared in Examples 4-7 were respectively added to a cigarette tobacco blend in an amount of 2% of the weight of the cigarette to prepare a cigarette sample 4 #, a cigarette sample 5 #, a cigarette sample 6 # and a cigarette sample 7 #. After the cigarette samples were equilibrated in a constant-temperature and constant-humidity environment of (20±1°) C and (60±3)% RH for 24 h, 20 or more smoking evaluators were organized to perform sensory evaluation on the cigarette samples with reference to Tobacco in processing-Sensory evaluation methods (YC/T 415-2011). The evaluation results are shown in Table 4.

TABLE 4

Sensory evaluation results

| Evaluation sample | | Cigarette sample 4# | Cigarette sample 5# | Cigarette sample 6# | Cigarette sample 7# |
| --- | --- | --- | --- | --- | --- |
| Aroma characteristics | Quality of aroma | 6.25 | 6.75 | 6.00 | 6.25 |
| | Quantity of aroma | 6.50 | 6.75 | 6.25 | 6.25 |
| | Offensive odor | 6.25 | 6.50 | 6.25 | 6.25 |
| | Volatility | 5.75 | 6.00 | 5.50 | 5.50 |
| Smoke characteristics | Concentration | 6.25 | 6.50 | 6.25 | 6.25 |
| | Strength | 6.25 | 6.75 | 5.75 | 6.00 |
| | Harshness | 5.75 | 6.00 | 5.75 | 5.75 |
| | Agglomeration | 5.75 | 6.00 | 5.50 | 5.75 |
| Taste characteristics | Irritancy | 5.75 | 6.00 | 5.65 | 5.75 |
| | Dry feeling | 5.75 | 6.00 | 5.50 | 5.50 |
| | Clean degree | 5.75 | 6.00 | 5.50 | 5.75 |
| | Sweet aftertaste | 5.25 | 5.50 | 5.00 | 5.25 |

As can be seen from the results in Table 4, after the tar extracts prepared in the examples of the present disclosure were added to the cigarette, the aroma characteristics, the smoke characteristics and the taste characteristics of the cigarette were improved to different degrees, and the sensory quality of the cigarette was improved, thereby providing an efficient path for widening the usage scope of inferior tobacco leaves and increasing the usage amount of the inferior tobacco leaves in middle- and low-end cigarettes.

The above are only examples of the present application, and the protection scope of the present application is not limited by these specific examples, but is determined by the claims of the present application. For those skilled in the art, various modifications and variations can be made to the present application. Any modification, equivalent replacement or improvement made within the technical ideas and principle of the present application shall fall within the protection scope of the present application.

What is claimed is:

1. A method for preparing a tar extract with aroma characteristics from a discarded cigarette butt, comprising the following steps:
   (1) adding the discarded cigarette butt to an extraction solvent, and carrying out subcritical fluid extraction to obtain an extraction solution; wherein the extraction solvent is at least one of n-butane, ethanol, petroleum ether, n-hexane, acetone, dichloromethane and ethyl acetate; the subcritical fluid extraction is carried out under an extraction pressure of 0.6-1.6 M/Pa at an extraction temperature of 20-60° C. for 10-120 min for 1-3 times;
   (2) carrying out vacuum filtration on the extraction solution, and carrying out vacuum distillation on the filtrate to obtain a concentrated extractum; and
   (3) carrying out two-stage molecular distillation on the concentrated extractum, and mixing light fractions of first-stage molecular distillation and second-stave molecular distillation to obtain the tar extract with aroma characteristics; wherein the first-stage molecular distillation is carried out at a heating temperature of 50-80° C. under a pressure of 100-200 Pa at a feed rate of 300-600 m·L/h and a film wiping speed of 200-300 rpm; and the second-stage molecular distillation is carried out at a heating temperature of 90-110° C. under a pressure of 40-60 Pa at a feed rate of 300-600 milih and a film wiping speed of 200-300 rpm;
   wherein the method further comprises a step of pretreating the discarded cigarette butt; wherein the pretreating specifically comprises: tearing off tipping paper from the discarded cigarette butt, removing cigarette paper and a residual tobacco blend, collecting a fiber tow, and cutting the fiber tow into small segments with a length of less than 1 cm.

2. The method according to claim 1, wherein in the step (1), a ratio of the discarded cigarette butt to the extraction solvent is 1 g:5-80 ml.

3. A tar extract prepared by the method according to claim 2, wherein the tar extract with aroma characteristics from step (3) comprise: furfural; furfuryl alcohol; ethylene glycol diacetate; 1-(1,3-dioxolan-2-yl)acetone; 4-cyclopentene-1, 3-dione; methylcyclopentenolone; 2-acetylfuran; 2(51H)-furanone; phenol; 5-methyllurfural; 3-methyl-2-cyclopenten-1-one; 3,4-dimethyl-2-cyclopentanone; methylcyclopentenolone; henzyl alcohol; 2,3-dimethyl-2-cyclopentenone; 2,6-dimethylphenol; ethylcyclopentenolone; 2,4,6-trimethylphenol; ethyl maltol; 4-ethylguaiacol; cinnamaldehyde; 5-hydroxymethylfurfural; 2,6-dimethoxyphenol; anisic aldehyde; 2-methylnaphthalene; vanillin; megastigmatrienone A; farnesol; phthalic acid 1-butyl 2-isobutyl ester; scopoletin; tributyl prop-1-ene-1,2, 3-tricarboxylate; oleamide; or natural vitamin E.

4. A method of using the tar extract according to claim 3 in the preparation of a cigarette comprising the step of adding the tar extract to an auxiliary material or a reconstituted tobacco blend of the cigarette in an amount of 2-5% of the weight of the cigarette.

5. The method according, to claim 4, wherein the cigarette is a middle- and low-end traditional cigarette.

6. The method according to claim 1, wherein in the step (2), the vacuum distillation is carried out at a temperature of 25-45° C. under a pressure of 0.06-0.08 MPa.

7. A tar extract prepared by the method according to claim 6, wherein the tar extract with aroma characteristics from step (3) comprise: furfural; furfuryl alcohol; ethylene glycol diacetate; 1-(1,3-dioxolan-2-yl)acetone; 4-cyclopentene-1, 3-dione; methylcyclopentenolone; 2-acetylfuran; 2(5H)-furanone; phenol; 5-methyllurfural; 3-methyl-2-cyclopenten-1-one; 3,4-dimethyl-2-cyclopentanone; methylcyclopentenolone; henzyl alcohol, 2,3-dimethyl-2-cyclopentenone; 2,6-dimethylphenol; ethylcyclopentenolone; 2,4,6-trimethylphenol; ethyl maltol; 4-ethylguaiacol; cinnamaldehyde; 5-hydroxymethylfurfural; 2,6-dimethoxyphenol; anisic aldehyde; 2-methylnaphthalene; vanillin; megastigmatrienone A; farnesol; phthalic acid 1-butyl 2-isobutyl ester; scopoletin; tributyl prop-1-ene-1,2, 3-tricarboxylate; oleamide; or natural vitamin E.

8. A tar extract prepared by the method according to claim 1, wherein the tar extract with aroma characteristics from step (3) comprise: furfural; furfuryl alcohol; ethylene glycol diacetate; 1-(1,3-dioxolan-2-yl)acetone; 4-cyclopentene-1, 3-dione; methylcyclopentenolone; 2-acetylfuran; 2(5H)-furanone; phenol; 5-methyllurfural; 3-methyl-2-cyclopenten-1-one; 3,4-dimethyl-2-cyclopentanone; methylcyclopentenolone; henzyl alcohol; 2,3-dimethyl-2-cyclopentenone; 2,6-dimethylphenol; ethylcyclopentenolone; 2,4,6-trimethylphenol; ethyl maltol; 4-ethylguaiacol; cinnamaldehyde; 5-hydroxymethylfurfural; 2,6-dimethoxyphenol; anisic aldehyde; 2-methylnaphthalene; vanillin; megastigmatrienone A; farnesol; phthalic acid 1-butyl 2-isobutyl ester; scopoletin; tributyl prop-1-ene-1,2, 3-tricarboxylate; oleamide; or natural vitamin E.

9. Use of the tar extract according to claim 8, in the preparation of a flavor, wherein the tar extract is applied to the flavor as an aroma component.

10. Use of the tar extract according to claim 8 in the preparation of a cigarette wherein the tar extract is added to an auxiliary material or a reconstituted tobacco blend of the cigarette in an amount of 2-5% of the weight of the cigarette.

11. The use according to claim 10, wherein the cigarette is a middle- and low-end traditional cigarette.

12. A method of using the tar extract according to claim 8 comprising the step of applying the tar extract as an aroma component in the preparation of a flavor enhancer.

* * * * *